May 26, 1964 — R. B. McCREERY — 3,134,231
HYDRAULIC MECHANISM
Filed Feb. 17, 1961 — 6 Sheets-Sheet 1
Fig. 1
Fig. 3
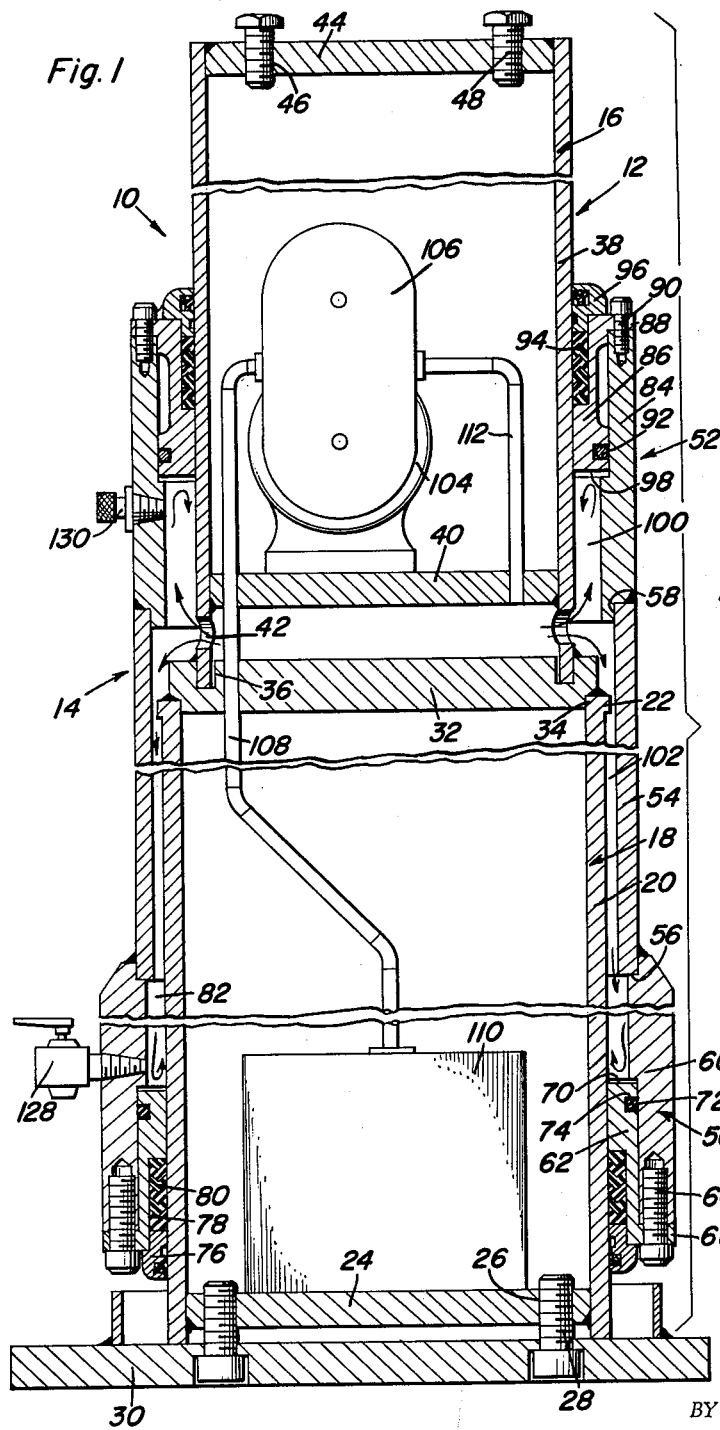
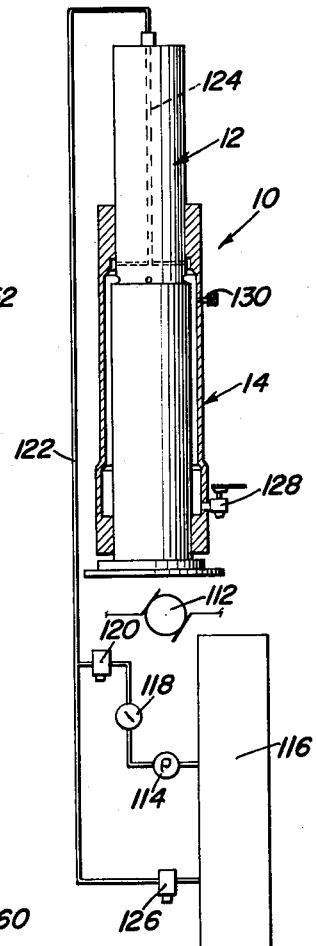
Robert B. McCreery
INVENTOR.
BY *Clarence A. O'Brien*
*and Harvey B. Jackson*
Attorneys May 26, 1964 R. B. McCREERY 3,134,231
HYDRAULIC MECHANISM
Filed Feb. 17, 1961 6 Sheets-Sheet 4

Robert B. McCreery
INVENTOR.

BY *Clarence A. O'Brien*
*and Harvey B. Jacobson*
Attorneys

May 26, 1964  R. B. McCREERY  3,134,231
HYDRAULIC MECHANISM
Filed Feb. 17, 1961  6 Sheets-Sheet 5
Fig. 8
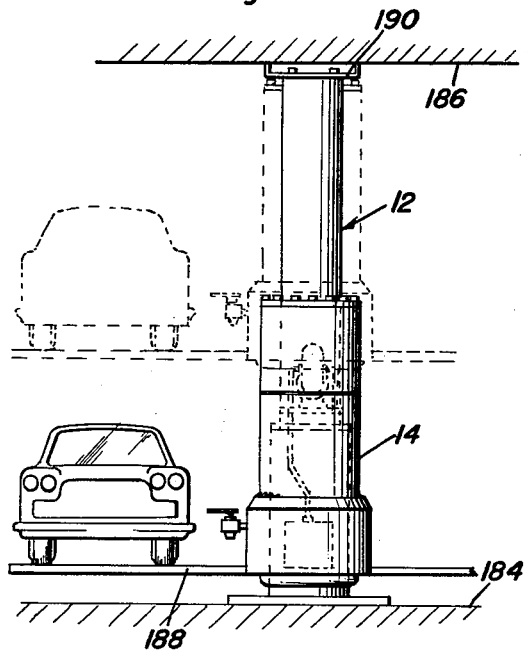
Fig. 9
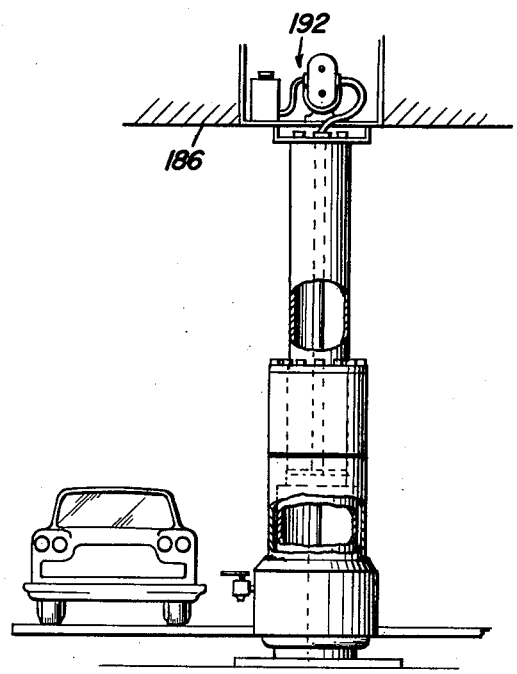
Fig. 10
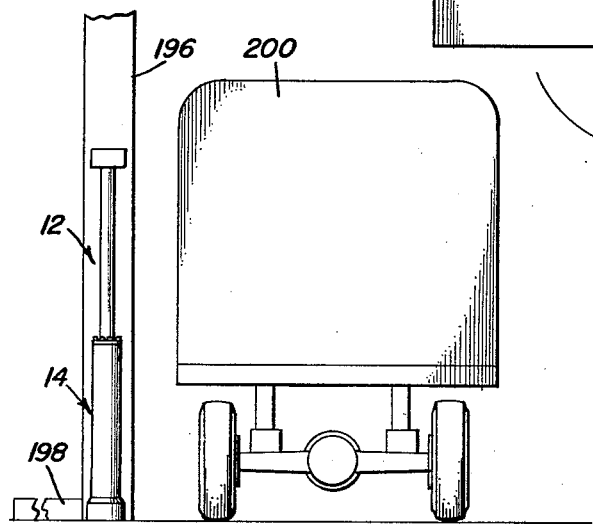
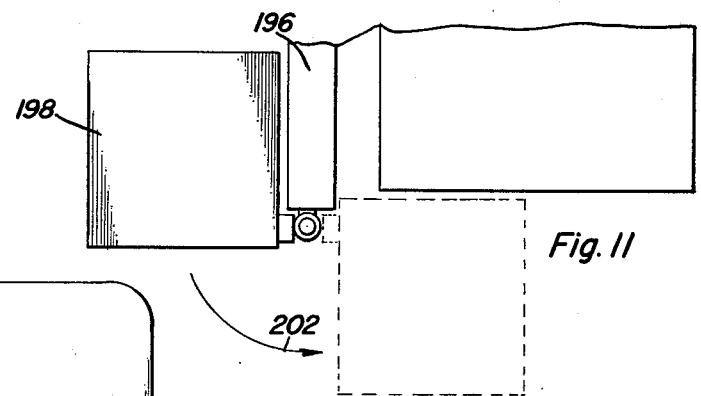
Fig. 11
Robert B. McCreery
INVENTOR.
BY *Clarence A. O'Brien*
and *Harvey B. Jacobson*
Attorneys

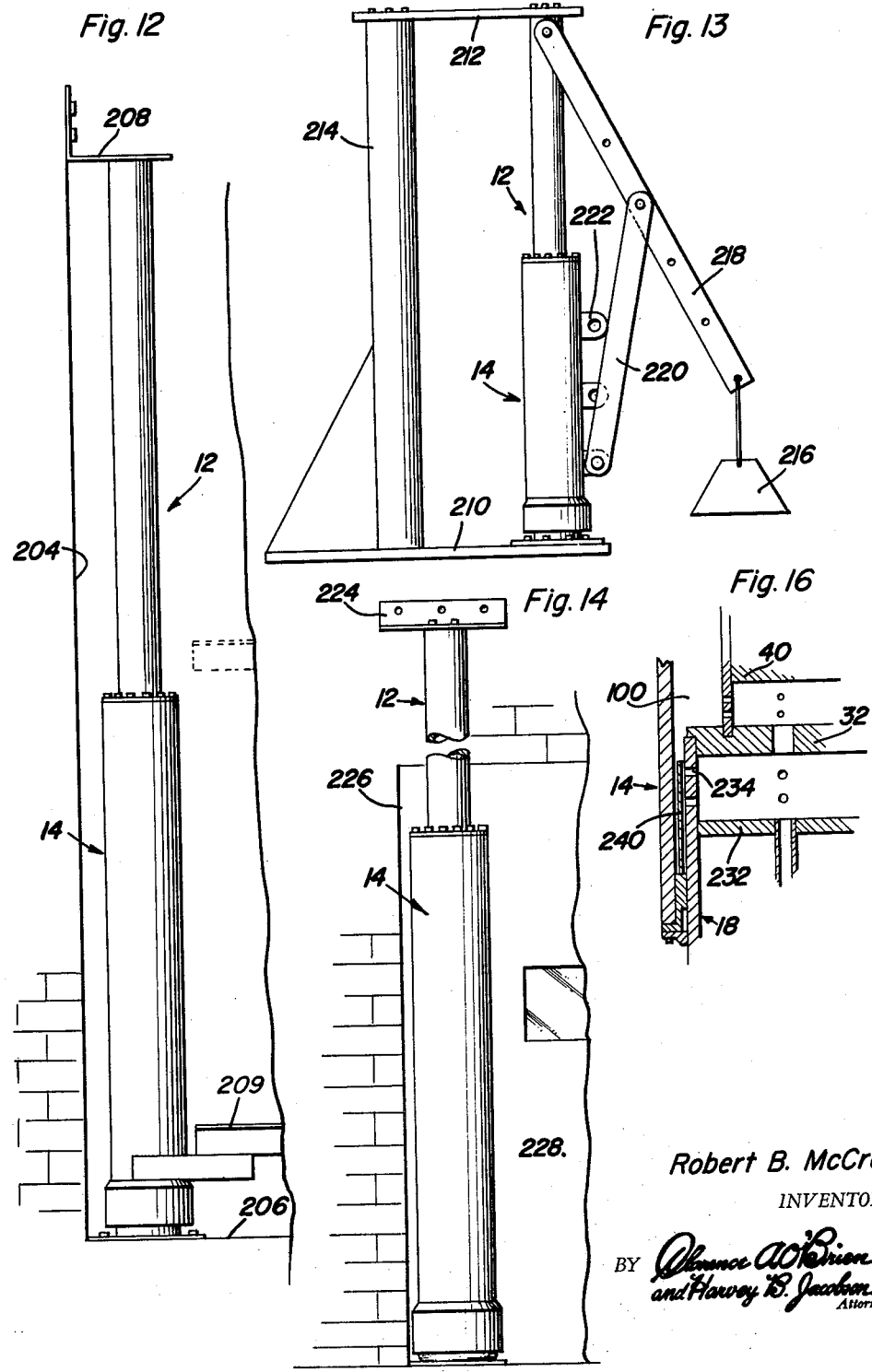

United States Patent Office 3,134,231
Patented May 26, 1964

3,134,231
HYDRAULIC MECHANISM
Robert B. McCreery, 610 N. Galloway, Xenia, Ohio, assignor of fifty percent to The Marmac Company, Xenia, Ohio, a corporation of Ohio
Filed Feb. 17, 1961, Ser. No. 89,980
11 Claims. (Cl. 60—52)

The present invention relates to a hydraulic lift or actuator mechanism which is novel and more useful from both load carrying and installational considerations. The invention further relates to various particular combinations rendered novel and unexpectedly advantageous by virtue of unique cooperative relationships which arise through use of the novel hydraulic lift or actuator mechanism in the combination.

Hydraulic lift mechanisms designed for use in connection with substantial loads, have heretofore generally involved a fixed cylinder within which the load carrying piston is disposed in retracted position and extended by the supply of hydraulic fluid under pressure to one end of the piston for the purpose of displacing the load carried on the piston. The hydraulic lift mechanism heretofore used in order to displace a load any considerable distance required a substantial volume of hydraulic fluid necessary to fill the expanding volume of the cylinder as the piston is displaced. Furthermore, the volume to be filled by the hydraulic cylinder was still further increased by virtue of the requirement for large diameter pistons increasing the cross sectional area of the cylinder so that the piston may sustain to some extent an eccentric load thereon. Moreover, the eccentricity of the load capable of being sustained by such hydraulic lift pistons despite the disadvantageous enlargement of its diameter was limited by the necessarily close spacing of the slide bearing assembly necessarily located at one end of the cylinder for slidably guiding the piston therethrough. Increasing the slide bearing spacing for purposes of sustaining larger eccentric loads on the piston necessarily reduced the stroke of the piston since the effective length of the cylinder would be decreased. The present invention therefore has as one of its important objects the provision of a hydraulic lift mechanism which avoids the aforementioned disadvantages of hydraulic lift mechanisms heretofore used. Accordingly, the hydraulic lift mechanism of this invention employs the differential pressure area principle for load displacement purposes by use of a novel structural arrangement in which an inner column having two different diameter portions slidably supports an outer cylinder which is movable with respect to the inner column in response to hydraulic pressure reacting against differential areas presented at axially opposite ends of the cylinder by the slide bearing assemblies which slide bearing assemblies are slidable relative to the inner column structure within the cylinder. As a result thereof, not only are the slide bearing assemblies in the hydraulic lift mechanism inherently spaced further apart than the hydraulic lift mechanism heretofore used so as to better sustain eccentric loading but a smaller volume of hydraulic fluid is required to displace the load by virtue of the smaller volume, annular fluid receiving cavity formed between the inner column structure and the outer cylinder at all times. Accordingly, the present hydraulic lift mechanism is less limited as to the eccentricity of the load that is capable of carrying, less limited as to the length of the stroke for the load displacement distance and also enables the use of larger diameter cylinder and piston column design for carrying greater loads without any correspondingly large increase in the volume of hydraulic fluid necessary to operate the lift mechanism as would be expected of hydraulic lift mechanism heretofore used.

A further object of this invention is to provide a hydraulic lift mechanism which not only has the more advantageous attributes hereinbefore mentioned but will also inherently provide a more rigid and useful guide structure for the load being displaced by the lift mechanism to thereby eliminate the necessity for additional guiding structure heretofore necessary for certain loads carried by the hydraulic lift mechanisms as heretofore used.

A still further object of this invention is to provide a hydraulic lift mechanism which by virtue of its more advantageous structural arrangement may more easily be installed in the desired installation and may provide a more facile connection to the load and to the hydraulic pressure supply equipment with which it is associated.

An additional object of the invention is to provide a hydraulic lift mechanism which may more conveniently store therewithin the fluid pressure equipment with which it is associated by virtue of the novel inner column structure thereof. Accordingly, if so desired, the hydraulic pump and reservoir and the connecting valve assemblies may be mounted within the inner column structure when said inner column structure is anchored to the frame.

A still further object of this invention is to provide a hydraulic lift mechanism which by virtue of the attributes thereof as hereinbefore mentioned renders it more widely useful singly or in pairs in many different combinations which are rendered novel as a result thereof. The hydraulic lift mechanism of the present invention may therefore be specifically useful in invalid bathtub chair lifts, auto parking lifts, truck loading platform mechanisms, cranes, elevator lifts, door operators, jack load raising mechanisms, and machine tool operating mechanisms such as radial drill presses. It will be understood of course that many other specific combinations in which the novel hydraulic lift mechanism may be uniquely useful will arise other than those specifically mentioned herein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal cross-sectional view of one form of the basic hydraulic lift mechanism made in accordance with this invention.

FIGURE 2 is a disassembled perspective view of the basic parts comprising the hydraulic lift mechanism of the present invention.

FIGURE 3 is a schematic representation of exemplary hydraulic fluid pressure supply equipment with which the hydraulic lift mechanism may be associated.

FIGURES 8 and 9 illustrate two different installational arrangements of the hydraulic lift mechanism for auto parking purposes.

FIGURES 10 and 11 illustrate the use of the hydraulic lift mechanism in a truck loading arrangement.

FIGURE 12 is a partial elevational view of one of a pair of hydraulic lift mechanism in an elevator lift installation.

FIGURE 13 is a side elevational view of the hydraulic lift mechanism adapted for use in a jib-type crane combination.

FIGURE 14 is a partial side elevational view of one of a pair of hydraulic lift mechanisms in another form of door operating mechanism.

FIGURES 15, 16 and 17 are partial sectional views of a modified form of hydraulic lift mechanism in various phases of movement.

Figure 4:
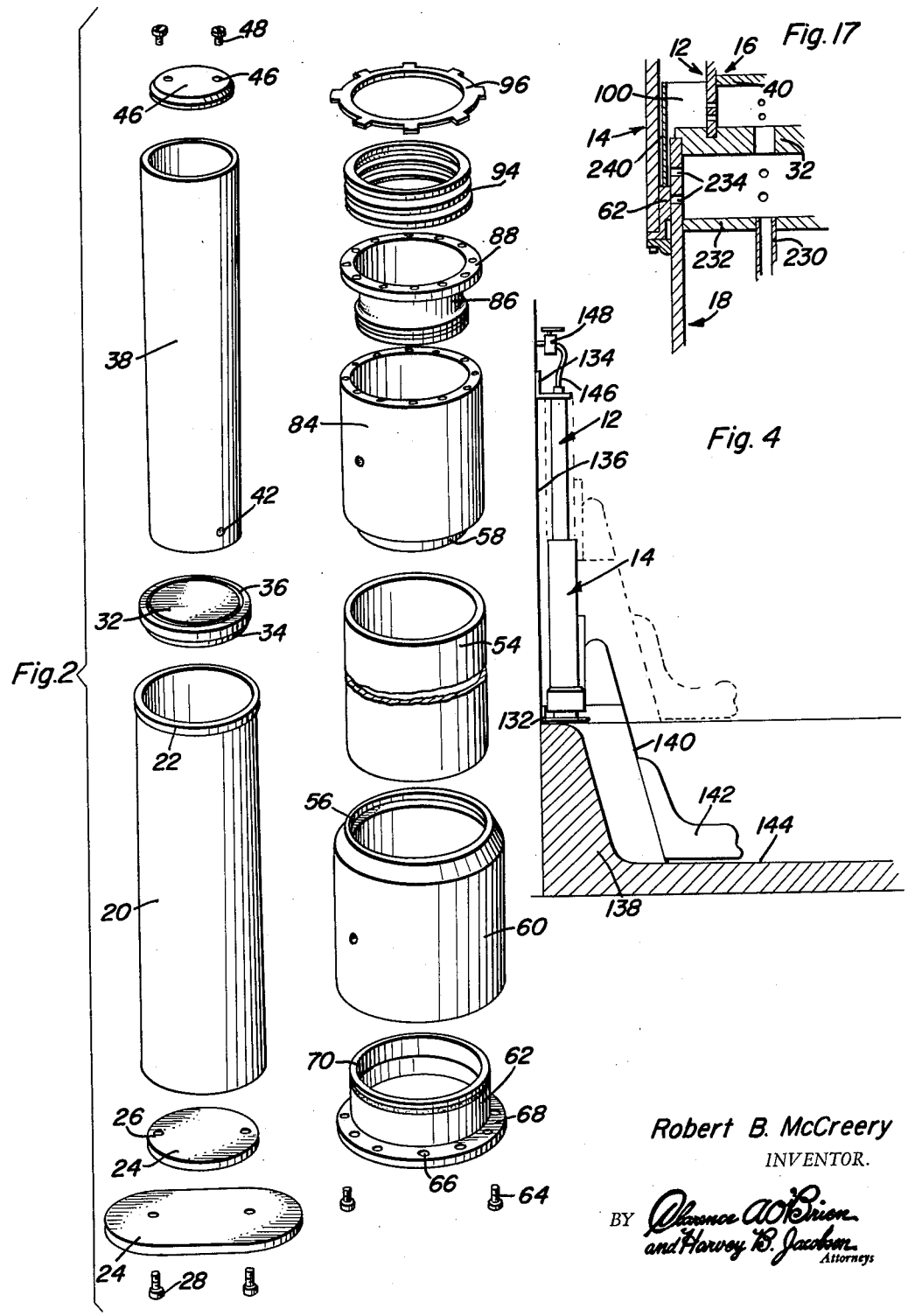
FIGURE 4 is a partial cross-sectional view of an invalid bathtub chair lift combination in which the hydraulic lift mechanism is particularly useful.

Referring now to the drawings in detail, attention is initially invited toward FIGURES 1, 2 and 3 for purposes of describing the basic hydraulic lift mechanism of the present invention before proceeding to describe it in connection with some of the many installations and combinations in which it is uniquely useful. The basic hydraulic lift mechanism which is generally referred to by reference numeral 10, consists of an inner guide column assembly generally referred to by reference numeral 12 with respect to which an outer cylinder assembly generally referred to by reference numeral 14, is slidable. The inner guide column assembly 12 includes a small diameter piston rod portion 16 which is rigidly connected to a larger diameter portion 18. It will be observed that both diameter portions 16 and 18 of the inner guide column assembly 12 are hollow and preferably cylindrical. The larger diameter portion 18 accordingly includes a cylindrical section 20 the portion of which within the cylinder forms a piston and may be made of any desired length depending on installational requirements. One end of the cylindrical section 20 includes an annular shoulder portion 22 for purposes as will hereafter be explained. Welded within and adjacent to the other end of the cylindrical section 20 is a lower head member 24 having a pair of threaded apertures 26 for receiving a pair of fastening bolt members 28 whereby the base plate member 30 may be secured to the lower end of the larger diameter portion 18 in order to anchor the inner column assembly 12 at one end when desired. Welded to the other axial end of the cylindrical section 20 of the larger diameter portion 18 is a piston plate member 32 including a shoulder 34 for accurate assembly onto the cylindrical section 20 before being welded thereto. An annular groove 36 is formed within the plate member 32 for purposes of receiving one axial end of a cylindrical section 38 of the smaller diameter piston rod portion 16 of the inner guide column assembly 12. The cylindrical section 38 may accordingly be accurately assembled in coaxial alignment with the larger diameter portion 18 by reception of the lower end of the cylinder section 38 within the annular groove 36 of the plate member 32 prior to welding thereof to the plate member. An inner plate member 40 may be welded within the cylindrical section 38 to form with the plate member 32 a chamber with which orifice apertures 42 communicate for purposes as will hereafter be explained. The other axial end of the cylindrical section 38 has an upper head member 44 welded thereto and includes a pair of threaded apertures 46 for threadedly receiving fastener elements 48 whereby the upper end of the inner column assembly 12 may be anchored when so desired.

Slidably disposed about the inner guide column assembly 12 is the outer cylindrical assembly 14 which includes at the axially opposite ends thereof end assemblies 50 and 52 respectively. The axial length of the cylinder assembly 14 may thereby be varied by varying the interconnecting intermediate cylindrical section 54 which is welded to the end assemblies 50 and 52 after being received within inwardly directed annular shoulder 56 and outwardly directed annular shoulder 58 formed within the end assemblies 50 and 52 respectively for assembling purposes. The lower end assembly 50 of the cylinder assembly 14 includes an outer cylindrical portion 60 to which an annular slide bearing member 62 is connected by means of a plurality of threaded fastener elements 64 which extend through apertures 66 in a flange portion 68 of the slide bearing member 62. One axial end of the slide bearing member 62 includes an annular pressure reacting surface 70. Accordingly, a fluid pressure sealing O-ring 72 is provided within an annular recess 74 provided therefor within the slide bearing member 62 adjacent the pressure reacting end 70. Also, a sealing gland member 76 closes an annular cavity 78 formed by the slide bearing member 62 with the outer cylindrical surface of the cylindrical section 20 of the larger diameter portion 18 of the inner guide column assembly within which cavity, packing 80 is confined. It will therefore also be observed that an annular fluid receiving cavity portion 82 is formed between the inner cylindrical surface of the cylindrical portion 60 and the outer cylindrical surface of the cylindrical section 20, one axial end of said cavity 82 being defined by the annular pressure reacting surface 70 of the slide bearing member 62. The upper end assembly 52 is of similar construction to that of the lower end assembly 50 and includes a cylindrical portion 84 of smaller internal and external diameter than the cylindrical portion 60 of the lower end assembly 50. Similarly connected to the upper axial ends of the cylindrical portion 84 is a slide bearing member 86 including a connecting flange portion 88 for fastening of the slide bearing member to the cylindrical portion 84 by the threaded fastener elements 90. The slide bearing member 86 also is provided with a sealing ring element 92 and with packing 94 confined therewithin by the packing gland ring 96. One axial end of the slide bearing member 86 also includes an annular pressure reacting surface 98 which is of greater area than that of the pressure reacting surface 70. Accordingly, the cross-sectional area of the annular cavity portion 100 formed between the outer cylindrical surface of the cylindrical section 38 and the inner cylindrical surface of the cylindrical portion 84 is greater in cross-sectional area than that of the annular cavity portion 82 although the inner and outer diameter dimensions are smaller. It will further be observed, that the annular cavity portion 82 and 100 are in fluid communication with each other by means of the annular passage 102 which axially extends therebetween, which annular passage 102 is also in communication with the orifice apertures 42 whereby hydraulic fluid under pressure may be supplied to the annular cavity portions. It will therefore be apparent that if the inner guide column assembly 12 is anchored at the top and bottom head members 30 and 44 thereof, supply of fluid under pressure to the annular cavity portion will react against the annular reacting surfaces 98 and 70 and thereby supply an axial force axially displacing the cylinder assembly 14 upwardly with respect to the inner column assembly 12 by virtue of the differential areas, or the difference in cross-sectional area which determines the effective area against which the hydraulic pressure will operate. Accordingly, the areas of surfaces 70 and 98 may be so varied for accommodating different installational requirements without affecting the lifting capacity of the system.

A modification of the basic hydraulic mechanism is shown in FIGURES 15–17 which relates to cushioning movement of the mechanism as it approaches the ends of its stroke. Supply of pressure to the mechanism in this form of the invention may be effected through a conduit 230 extending through alternatively the smaller or larger sections 16 or 18 of the inner guide column 12. As illustrated the conduit 230 is disposed for example in the section 18. Also, section 18 has disposed therein a partition member 232 to form an upper chamber in communication with the annular cavity 100 in cylinder 14 by means of a plurality of smaller orifices 234. A passage 236 connects the chamber within section 18 with the chamber formed in section 16 between members 40 and 32, the latter chamber also being in communication with the annular cavity 100 by means of a plurality of orifices 238. Finally, a flow restricting sleeve 240 is connected to and movable with the slide bearing 62 within the cavity 100.

As is apparent in FIGURE 15, flow of fluid will proceed relatively unrestricted through all of the orifices 234 and 238 into the cavity 100 to immediately effect upward displacement of the cylinder 14 relative to the inner guide column 12. When the cylinder 14 approaches the end of the stroke as seen in FIGURE 16, the sleeve 240 restricts flow through the orifices 234 and hence retards or slows down continued movement. Near the end of the stroke (FIGURE 17) the slide bearing 62 covers some of the orifices to even further restrict flow into the cavity 100 to thereby provide a "cushioning" effect.

From the foregoing structural description of the basic components of the hydraulic lift mechanism, the many advantages heretofore mentioned will become apparent. Some of the important advantages may be listed as follows: (1) The inner fixed column structure enables the use of a larger diameter piston without any disadvantageous increase in fluid volume, providing greater rigidity and guiding functions for the hydraulic lift mechanism. (2) A smaller quantity of oil and hence less costly hydraulic supply equipment will be required because of the differential pressure action relied upon for cylinder displacement arising from the stepped diameter construction of the inner column assembly. (3) More widely spaced slide bearings are inherent characteristics of the hydraulic lift mechanism rendering it more useful for sustaining eccentric loads without sacrifice of stroke length. (4) Because of the inner guide column feature and movement of the cylinder with respect thereto, easier installation of the hydraulic lift mechanism is made possible. (5) The hollow inner guide construction provides convenient housing for pump, reservoir and valve equipment when desired. (6) The load displacement by connection to the outer cylinder enables the lift mechanism to be more easily geared for rotational purposes so as to serve many different functions. (7) Assembly of the parts making up the basic hydraulic lift mechanism, is made easier and more accurate, while some of the parts may be dimensionally varied so as to adapt the basic hydraulic lift mechanism to any installational requirement. (8) Movement may be more easily cushioned near the ends of the stroke.

The above enumerated advantages of the hydraulic lift mechanism will become even more apparent from the description of the particular combinations to be dealt with hereafter.

A hydraulic pressure supply arrangement will of course be necessary in order to render the hydraulic lift mechanism operative. The hydraulic supply equipment may be functionally and operatively related to the basic hydraulic lift mechanism in many different ways including for example the convenient housing thereof within the inner guide column assembly 12 as illustrated in FIGURE 1. Accordingly, as schematically shown in FIGURE 1, mounted within the upper smaller diameter portion 16 of the inner guide column assembly is a motor 104 drivingly connected to a pump 106 which is operatively connected by conduits 108 to a hydraulic reservoir 110 located within the larger diameter portion 18. The hydraulic fluid pump 106 discharges into a conduit 112 which is connected to the space between the plate members 32 and 40 which communicate through the orifices 42 with the annular cavity portion for cylinder actuation purposes. The locational positioning of the hydraulic pressure fluid supply equipment is merely exemplary of the many different locational arrangements possible with the novel construction of the present invention. For example all of the equipment may be located within one of the diameter portions of the inner column assembly or the hydraulic pressure supply equipment may be located external to the hydraulic lift mechanism 10 as illustrated in FIGURE 3 for example. FIGURE 3 accordingly illustrates a motor 112 coupled to a pump 114 which draws hydraulic fluid from a reservoir 116 for supply through check valve 118 and control valve 120 and conduit 122 to the annular cavities within the hydraulic mechanism 10 by means of an internal supply pipe 124 extending through one of the diameter portions of the inner guide column assembly 12. Also provided in the hydraulic system illustrated in FIGURE 3 is a lowering valve 126 through which the fluid pressure may be exhausted from the cavity formation upon opening of the valve 126 to connect the conduit 122 to the reservoir 116 after the supply control valve 120 has been closed. Accordingly, control over the movement of the hydraulic mechanism may be exercised through control valves 120 and 126 and/or energization of the pump motor 112 with all or parts of the foregoing equipment mounted internally of the hydraulic mechanism or externally thereof. In connection with the supply and exhaust of fluid to the hydraulic lift mechanism 10, it will be observed that an oil bleed or drain valve 128 is connected to the lower end assembly 50 for communication with the annular cavity portion 82 while an air bleed valve 130 is provided for in the upper end assembly 52 for communication with the annular cavity portion 100. It should also be understood that the fluid supply to the annular fluid receiving cavities 82 and 100 may also be provided by hydraulic connection to and through the walls of the cylinder assembly 14.

In FIGURE 4 we note therefore one particular use to which the hydraulic lift mechanism may be put. It will be noted therefore that the column assembly of the hydraulic lift mechanism as illustrated in FIGURE 4 is anchored by suitable brackets 132 and 134 to a wall 136 above one end of a bathtub 138. Connected to the cylinder assembly 14 and projecting forwardly and downwardly therefrom is a chair connecting member 140 to which an invalid chair 142 is connected and positioned at the bottom 144 of the bathtub when the cylinder assembly 14 is in its lowered position as illustrated by solid line in FIGURE 4. When fluid under pressure which may be in the form of the household water supply is connected to the hydraulic lift mechanism through conduit 146 under the control of any suitable mechanism 148, the cylinder assembly 14 together with the chair 142 may be controllably raised toward a position illustrated by dotted line in FIGURE 4 for the purpose of lowering and raising an invalid into a bathtub. The ability of the novel hydraulic lift mechanism 10 to sustain eccentric loads such as the invalid chair with an occupant thereon for a relatively small lift mechanism as compared with hydraulic lift mechanisms heretofore used makes the present hydraulic lift mechanism especially useful for the invalid chair lift illustrated in FIGURE 4 since the hydraulic mechanism may be more easily installed as illustrated, occupy less space and be effectively operative.

Figure 5:
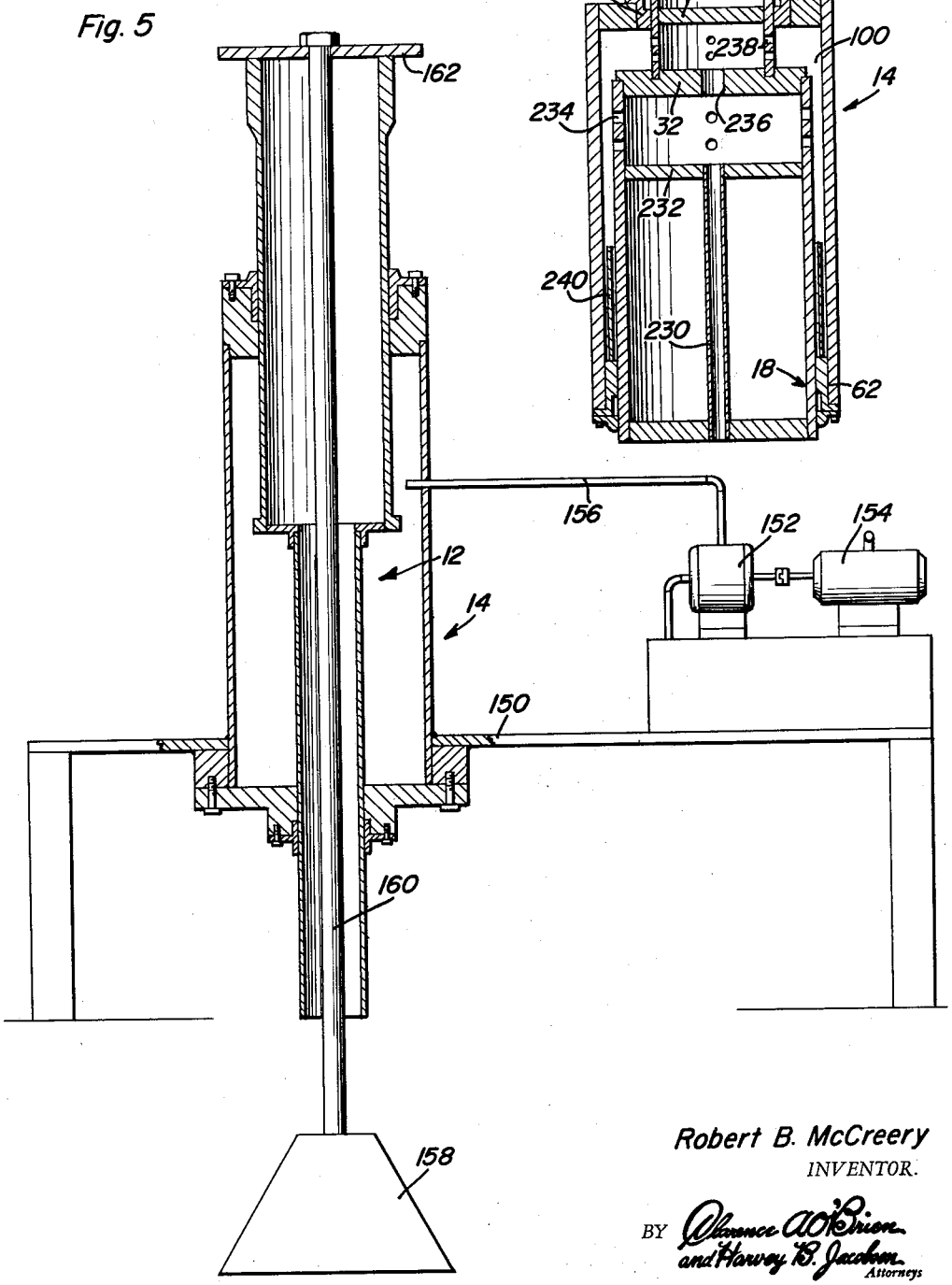
FIGURE 5 is a partial cross-sectional view of a hollow piston jack mechanism employing the basic structure of the hydraulic lift mechanism of the present invention.

Referring now to FIGURE 5 another adaptation of the hydraulic lift mechanism is illustrated therein. In FIGURE 5, it will be observed that the cylinder assembly 14 is anchored to the frame 150 while the inner column assembly 12 is movable with respect thereto. The pump mechanism 152 driven by the motor 154 may accordingly supply fluid under pressure through conduit 156 to the annular fluid receiving cavities within the cylinder assembly 14 causing axial displacement of the inner column assembly 12 with the same advantages as heretofore mentioned. A further advantage of the arrangement illustrated in FIGURE 5 however, is the suspension of the load 158 by the rod 160 which may be connected to one end of the large diameter portion of the inner column assembly 12 by the plate member 162 with the other end of the inner column assembly 12 being open so that the rod 160 may extend therethrough. The arrangement of FIGURE 5 accordingly takes advantage of the novel constructional arrangement of the hydraulic lift mechanism by inverting it and anchoring the cylinder assembly 14. The load 158 may thereby be raised and lowered with all the advantages heretofore mentioned in connection with the hydraulic mechanism and may further be provided with accurate axial guiding facilities by virtue of the particular arrangement as described with respect to FIGURE 5.

Figure 6:
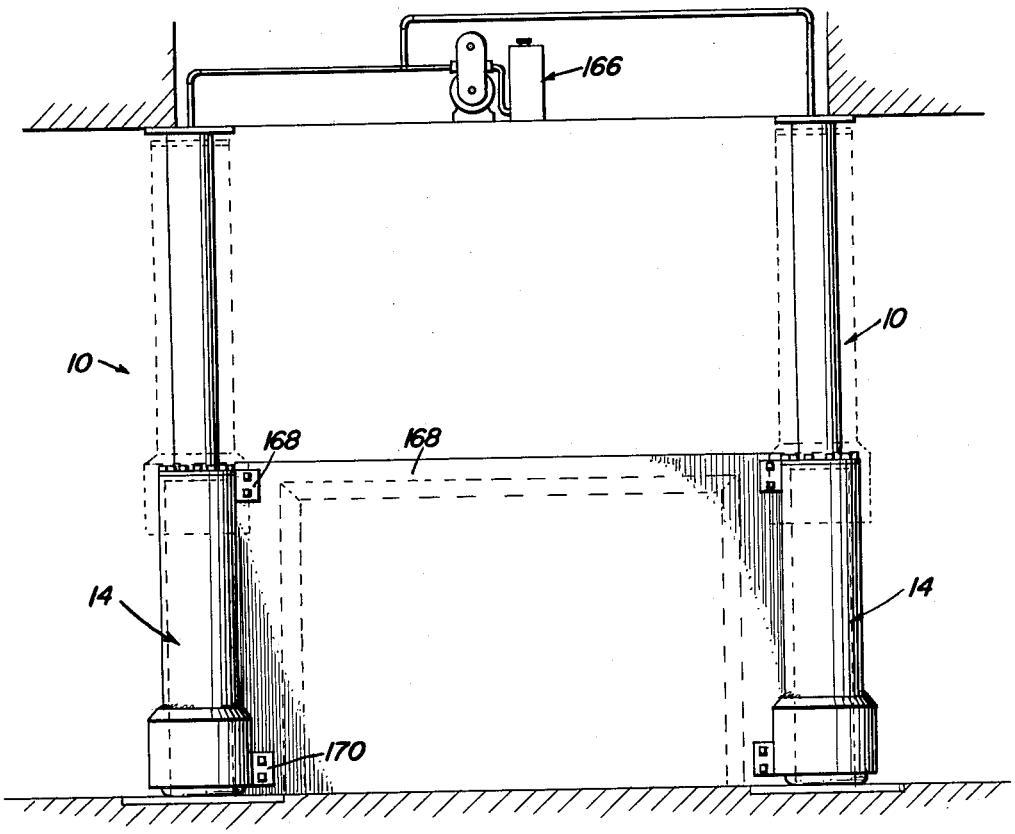
FIGURE 6 illustrates one form of door operating mechanism for which a pair of hydraulic lift mechanisms made in accordance with the present invention is particularly useful.

FIGURE 6 illustrates a particular use of a pair of hydraulic lift mechanisms in which the movable cylinder assemblies 14 are interconnected with each other by a door 164 with the hydraulic supply equipment 166 being conveniently placed above the hydraulic lift mechanisms and in between for operative connection thereto from above. The combined lifting power afforded by the pair of hydraulic lifting mechanism 10 for the door 164 is further enhanced by the fact that no guiding facilities will be needed for the door 164 for slidable movement thereof in a vertical direction inasmuch as the hydraulic mechanism 10 provides the guiding function as was heretofore mentioned. Also, the ability of the novel hydraulic lift mechanism 10 to provide a large displacing stroke without the correspondingly large volume of hydraulic fluid or oil renders the arrangement of FIGURE 6 especially useful wherein the door 164 which may be considerably heavy vault door must be raised a substantial distance. It will therefore be observed in FIGURE 6, that each of the cylinders assemblies 14 are connected to the door 164 at upper and lower ends thereof by suitable connecting bracket members 168 and 170.

Figure 7:
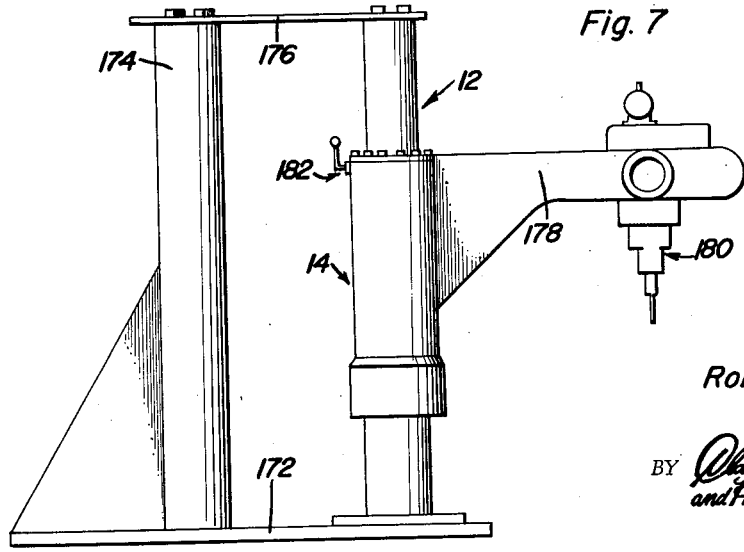
FIGURE 7 is a side elevational view of a radial drill press in which the hydraulic lift mechanism structure has been adapted for machine tool purposes.

FIGURE 7 illustrates a machine tool adaptation for the hydraulic lift mechanism. It will accordingly be observed in FIGURE 7 that the inner guide column assembly 12 is anchored to the machine tool frame base 172 at a lower end and to a stabilizing frame member 174 by the upper plate member 176 connected to the upper end of the inner guide column assembly 12. The cylinder assembly 14 is so modified as to have connected thereto the radial drill press arm 178 which carries at its projecting end a power drill mechanism 180. Accordingly, the drill mechanism 180 may be raised or lowered with respect to work disposed therebelow by hydraulic control of the cylinder assembly 14 with respect to the inner column assembly 12 as heretofore described. Also, a lock mechanism 182 is provided in the cylinder assembly 14 for the purpose of locking the cylinder assembly 14 in any angular position relative to the inner column assembly 12. The hydraulic lift mechanism components adapted for the installation illustrated in FIGURE 7 will be particularly useful because of its ability to sustain the large eccentric load with less deflection by virtue of the wide spacing of the slide bearing members within the cylinder assembly 14 as hereinbefore described. The large diameter inner column assembly 12 also provides the requisite rigidity for the machine tool installation.

Referring now to FIGURES 8 and 9, it will be observed that the hydraulic lift mechanism is more conveniently installed between a floor 184 and a ceiling 186 of a parking garage. Connected to the lower end of the cylinder assembly 14 and extending from both sides thereof are car lift platforms 188 whereby an auto may be raised to an upper level as illustrated by dotted line in FIGURE 8 so that a greater number of automobiles may be accommmodated for the floor space available. The platform 188 may also be modified for performing various services on the auto. The inner column assembly 12 is accordingly anchored at its lower end to the floor 184 and at its upper end by a suitable bracket 190 to the ceiling 186. The hydraulic lift mechanism in the installation illustrated in FIGURE 8 is not only useful because of the greater loads that it may sustain and the greater eccentricity of such loads that it is capable of accommodating but it is also extremely advantageous because of the premium of space available beneath the floor or above the ceiling. The car parking installation may also be adapted for exposed parking facilities in which case supporting structure will be associated with the inner guide column.

It will be observed therefore, that the equipment associated with the hydraulic lift mechanism may be stored within the mechanism itself so that no modification of the building structure is required for accommodating the hydraulic lift mechanism and it will also be observed that the hydraulic mechanism may be entirely disposed between the floor and ceiling requiring no recesses or interfloor accommodations as would be required by hydraulic lift mechanisms heretofore used in order to afford the necessary hydraulic lift displacement for raising the load to a proper level. In FIGURE 9, it will be observed that the hydraulic pressure supply equipment 192 is disposed within the ceiling 186 as an alternative arrangement to that illustrated in FIGURE 8 as far as the location of the hydraulic supply equipment is concerned.

Referring now to FIGURES 10 and 11, an arrangement is illustrated for the hydraulic lift mechanism which takes advantage of its ability to be geared for angular displacement of the load raising cylinder assembly 14 relative to the supporting inner column assembly 12. Accordingly, the inner supporting column assembly 12 of the hydraulic lift mechanism may be anchored at the bottom within a doorway 194 formed within a building wall 196 of a warehouse for example through which merchandise may be unloaded. The hydraulic lift mechanism is accordingly mounted along one vertical side of the doorway within which suitable mechanism is disposed for rotational drive of the cylinder assembly 14 in order to rotate the loading platform 198 connected to the bottom thereof from the position illustrated by solid line in FIGURE 11 to the position illustrated by dotted line in FIGURE 11. A truck 200 may therefore park alongside the wall 196 with the rear thereof adjacent to the loading doorway 194 so that a loaded platform 198 may be swung out of the doorway 194 as illustrated by the arrow 202. The hydraulic mechanism is subsequently actuated by supply of hydraulic fluid under pressure thereto as hereinbefore described in order to raise the loaded platform 198 up to the level of the truck bed for readily moving the load into the truck. The arrangement illustrated in FIGURES 10 and 11 is particularly useful where truck loading facilities have not been originally provided for in a building construction. The utility of the novel hydraulic lift mechanism in the installation described with respect to FIGURES 10 and 11 will be apparent in view of its ability to sustain the tremendous eccentric load and the facilities provided for rotational drive of the outer load carrying cylinder assembly 14.

FIGURE 12 illustrates an elevator installation for the hydraulic lift mechanism. It will be observed therefore that the hydraulic lift mechanism may be positioned within an elevator shaft 204 and have its inner supporting column assembly 12 anchored at its lower end to the bottom 206 of the elevator shaft while its upper end is anchored by a bracket member 208 to a side of the elevator shaft 204. The elevator platform 209 may therefore be connected to the lower end of the cylinder assembly 14 for raising the elevator platform relative to the inner guide assembly 12 which also provides the necessary guiding facility for the elevator platform. The installation for the hydraulic lift mechanism as illustrated in FIGURE 12 accordingly takes advantage of the hydraulic lift mechanism exceptional ability to provide a long stroke with use of a minimum quantity of oil to provide a guiding structure.

Referring now to FIGURE 13, the versatility of the hydraulic lift mechanism of the present invention will be immediately apparent. The supporting column assembly 12 is accordingly anchored to a base 210 of the crane assembly at the lower end thereof while the upper end of the assembly 12 is connected by the plat member 212 to the upper end of a stabilizing column 214 for the crane. The load 216 is therefore connected to a movable boom 218 of the crane which is pivotally connected to the upper end of the supporting column assembly 12 while a connecting link member 220 adjustably interconnects the movable boom member 218 to the displaceable cylinder assembly 14 which has a plurality of link connecting bracket members 222 connected thereto. Accordingly, the basic hydraulic lift mechanism in addition to the attributes heretofore mentioned with respect thereto provides means for pivotally supporting the movable boom of the crane and also vertically adjustable facilities for connection of the link member 220 to the cylinder assembly 14 not possible with hydraulic lift mechanisms heretofore used. The arrangement of the novel hydraulic lift mechanism is accordingly uniquely adaptable for the crane installation as illustrated in FIGURE 13.

FIGURE 14 illustrates another form of door operating mechanism utilizing a pair of hydraulic lift mechanisms. In FIGURE 14, the supporting column assembly 12 is anchored at its lower end to the floor and at its upper end by a bracket member 224 to the wall of the building and is positioned within and rearwardly of the doorway 226 within which the door 228 is disposed. The door 228 may thereby be vertically displaced for opening thereof by connection to the cylinder assemblies 14. It will be observed from the installation in FIGURE 14, that the door 228 is not only provided with vertical guides in the supporting column assembly 12 but also the components of the basic hydraulic lift mechanism may be conveniently installed for operation of the door 28 as an addition to the building construction requiring no modification thereof.

From the foregoing description of both the hydraulic lift mechanism construction and operation, constructional variations and operational variations, and the particular installations therefore, it will be appreciated by those skilled in the art that a significant and noteworthy contribution has been made in hydraulic lift mechanism art as well as in those arts relating to invalid chair lifts, auto parking lifts, truck loading and load handling, crane apparatus, elevator lift apparatus, door operator mechanism, load raising mechanism and machine tool positioning mechanism. It will also be apparent that each of the particularly described installations of the novel hydraulic lift mechanisms take advantage of, to different extents, different combinations of attributes of the novel hydraulic lift mechanism.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hydraulic lift mechanism comprising, inner guide column means, cylinder means disposed about said column means to define a continuous fluid receiving cavity therebetween of different reduced cross-sectional areas, spaced slide bearing means mounted adjacent opposite axial ends of the cylinder means for sliding and load guiding engagement with the column means providing differential pressure areas at axial ends of the cavity, anchoring means mounted at said opposite axial ends of the column means, eccentric load engaging means connected to the cylinder means, fluid pressure supply means mounted within the column means in communication with said cavity for supply of fluid under pressure thereto causing axial displacement of the cylinder means relative to the column means, said column, means including a large diameter portion slidably engageable by one of said spaced bearing means and a smaller diameter portion slidably engageable by the other of said spaced bearing means, one of said diameter portions including means within the cylinder means for limiting the axial stroke of the cylinder means relative to the column means.

2. The combination of claim 1 including orifice means disposed in one of the diameter portions of the column means adjacent to the other diameter portion to provide communication between the supply means and the fluid receiving cavity.

3. The combination of claim 2, wherein said cylinder means comprises axial end assemblies mounting said slide bearing means and defining annular cavity portions of unequal cross-sectional area and an intermediate cylindrical section interconnected to the end assemblies defining a passage between said cavity portions for fluid communication therebetween.

4. The combination of claim 3, wherein said fluid supply means comprises, fluid pump means mounted within one of said diameter portions of the column means and operatively connected to fluid reservoir means also mounted within one of said diameter portions of the column means.

5. A hydraulic lift mechanism comprising, inner guide column means, cylinder means disposed about said column means to define a continuous fluid receiving cavity therebetween of different reduced cross-sectional areas, spaced slide bearing means mounted adjacent opposite axial ends of the cylinder means for sliding and load guiding engagement with the column means providing differential pressure areas at axial ends of the cavity, said column means including a large diameter portion slidably engageable by one of said spaced bearing means and a smaller diameter portion slidably engageable by the other of said spaced bearing means, one of said diameter portions including means within the cylinder means for limiting the axial stroke of the cylinder means relative to the column means in both axial directions.

6. The combination of claim 5, including conduit supply means extending through one of said diameter portions of the column means for communication with the fluid receiving cavity.

7. The combination of claim 6, including orifice means disposed in the smaller diameter portion of the column means adjacent to the large diameter portion to provide communication between the supply means and the fluid receiving cavity.

8. A hydraulic lift mechanism comprising, inner guide column means, outer assembly means disposed about said column means and having a variable internal diameter to define a fluid receiving cavity varying in volume in response to movement relative to the column means, elongated bearing means mounted adjacent opposite axial ends of the outer assembly means for slidably and rotatably mounting the outer assembly means on the column means and including means providing differential pressure areas at axial ends of said cavity to effect said relative movement in one direction upon supply of fluid under pressure to said cavity said outer assembly means comprising axial end assemblies mounting said slide bearing means and defining annular cavity portions of unequal outer radii and cross-sectional areas and an intermediate cylindrical section interconnected to the end assemblies defining a passage between said cavity portions for fluid communication therebetween.

9. A hydraulic lift mechanism comprising, inner guide column means, cylinder means disposed about said column means to define a fluid receiving cavity therebetween of different reduced cross-sectional areas, spaced slide bearing means mounted adjacent opposite axial ends of the cylinder means for sliding and load-guiding engagement with the column means and providing differential pressure areas at axial ends of the cavity, fluid chamber means formed within said column means, fluid supply conduit means operatively connected to the chamber means for supply of fluid under pressure thereto, orifice means disposed in the chamber means providing fluid communication between the chamber means and fluid receiving cavity, and means connected to the spaced slide bearing means for progressively restricting fluid flow through said orifice means as the cylinder means is displaced relative to the column means beyond a predetermined amount.

10. A fluid actuated load controlling device comprising, a load supporting column having at least two elongated slide bearing portions of different cross-sectional dimension, an outer assembly forming an annular fluid chamber about the column, said outer assembly including a pair of end sections of different cross-sectional dimensions interconnected by an intermediate section to vary the cross-sectional area of said annular fluid chamber along the column, elongated bearing means mounted on said end sections of the outer assembly slidably engageable with said slide bearing portions of the column to slidably mount the outer assembly thereon and seal the fluid chamber formed therein, and means for supplying fluid under pressure to said fluid chamber to vary the volume of said fluid chamber, the end section of the outer assembly having the smaller cross-sectional dimension defining a cross-sectional area of the fluid chamber which is larger than the cross-sectional area defined by the end section having the larger cross-sectional dimension whereby, said variation in the volume of the fluid chamber is produced by relative movement between the column and the outer assembly through supply of a reduced volume of fluid by the fluid supplying means.

11. The combination of claim 10, including means on one of said slide bearing portions having the larger cross-sectional dimension for limiting said relative movement.

References Cited in the file of this patent

UNITED STATES PATENTS

| | | |
|---|---|---|
| 816,679 | Murray | Apr. 3, 1906 |
| 1,277,567 | Garrison | Sept. 3, 1918 |
| 2,334,841 | Raiche | Nov. 23, 1943 |
| 2,570,647 | Cormier | Oct. 9, 1951 |
| 2,605,002 | Graves | July 29, 1952 |
| 2,614,835 | Margison et al. | Oct. 21, 1952 |
| 2,625,390 | McFadden | Jan. 13, 1953 |
| 2,688,313 | Bauer | Sept. 7, 1954 |
| 2,771,197 | Leffler | Nov. 20, 1956 |
| 2,779,949 | Crispen | Feb. 5, 1957 |
| 2,789,544 | Dermond | Apr. 23, 1957 |
| 2,813,277 | Zillt | Nov. 19, 1957 |
| 2,838,910 | Bacchi | June 17, 1958 |
| 2,841,117 | Senn | July 1, 1958 |
| 2,901,928 | Heyer | Sept. 1, 1959 |
| 2,930,261 | Emrick | Mar. 29, 1960 |
| 2,939,284 | Gertz | June 7, 1960 |

FOREIGN PATENTS

| | | |
|---|---|---|
| 392,108 | Great Britain | May 11, 1933 |
| 627,231 | Great Britain | Aug. 3, 1949 |
| 697,619 | Germany | Oct. 18, 1940 |
| 491,759 | Italy | Mar. 11, 1954 |